United States Patent [19]
Sze

[11] 3,951,862
[45] Apr. 20, 1976

[54] PROCESS FOR THE PREPARATION OF AMMONIA SYNTHESIS CATALYST

[75] Inventor: Morgan C. Sze, Upper Montclair, N.J.

[73] Assignee: The Lummus Company, Bloomfield, N.J.

[22] Filed: Oct. 30, 1974

[21] Appl. No.: 519,481

[52] U.S. Cl. .............................. 252/446; 252/447; 252/462; 423/362
[51] Int. Cl.² ..................... B01J 21/18; B01J 23/10
[58] Field of Search .................. 252/446, 447, 462; 423/362

[56] References Cited
UNITED STATES PATENTS 3,660,028  5/1972  Tamaru et al. ................. 252/447 X
3,839,229  10/1974  Senes et al. ..................... 252/462 X Primary Examiner—W. J. Shine
Attorney, Agent, or Firm—Michael Klotz

[57] ABSTRACT

A process for the preparation of an ammonia synthesis catalyst, in which an iron oxide, together with traces of aluminum, calcium, potassium, magnesium and silicon oxides, is fused in the presence of a small quantity of graphite and reduced and the reduced catalyst is thereafter treated with an aqueous solution of a water soluble cerium salt.

The use of the so prepared catalyst in the synthesis of ammonia makes it possible to operate at significantly reduced temperatures and/or pressure, and thereby obtain very considerable capital and operational savings.

16 Claims, No Drawings

PROCESS FOR THE PREPARATION OF AMMONIA SYNTHESIS CATALYST

The present invention relates to a process for the preparation of an ammonia synthesis catalyst and, in particular, to the preparation of an ammonia synthesis catalyst based on reduced iron oxide together with traces of oxides of aluminum, calcium, potassium, magnesium, silicon and other oxides usually employed in the preparation of such catalysts.

It is well known to prepare catalysts for the synthesis of ammonia by fusing iron oxide together with other suitable metallic oxides, followed by reduction. Many methods for the preparation of ammonia synthesis catalysts have been proposed but none have made it feasible to produce ammonia at temperatures of less than about 900° to 1020°F which require special expensive equipment.

Applicants now have discovered that ammonia synthesis catalysts which make ammonia production possible at lower temperatures and/or lower pressures can be prepared if a small quantity of graphite is incorporated with the iron oxide before the fusion and reduction of the catalyst, and if cerium is incorporated in the catalyst after fusion.

In accordance with this invention, a small quantity of graphite, preferably from 0.1 to 0.2% by weight, is incorporated in the iron oxide before the fusion and reduction, and the so-reduced catalyst is treated with an aqueous solution of a cerium salt.

It is accordingly an object of this invention to prepare an ammonia synthesis catalyst which is particularly suitable for operating the ammonia synthesis at lower temperatures and/or pressure than has hitherto been possible. It is a further object of this invention to prepare an ammonia synthesis catalyst of high efficiency at all operating temperatures and pressures for synthesizing ammonia from hydrogen and nitrogen.

Other objects of the invention will be clear from the description which follows.

These objects are accomplished by fusing iron oxide and other metallic oxides in the presence of a small quantity of graphite, reducing the fused mass and incorporating ceriun into the reduced catalyst after the fusion and reduction.

In accordance with one embodiment of the invention, cerium is incorporated into the catalyst by treating the reduced catalyst with an aqueous solution of a cerium salt.

A mischmetal salt, containing cerium, may also be incorporated into the iron catalyst in like fashion.

Graphite is suitably added to the iron oxide in powdered form, most advantageously in very finely powdered form, to facilitate its thorough mixing with the iron oxide. In accordance with the new discovery underlying the present invention, it has been found that the addition of a small quantity of graphite to the iron oxide before the fusion and reduction, makes it possible to obtain a catalyst having a much increased pore size as compared with iron catalysts previously used for this purpose. While we do not wish to be bound by the theory, and while the mechanism of the formation of the larger pore size catalyst is not well understood, it is believed that the insertion of the graphite powder between iron oxide particles during fusion helps to form a wider spaced iron structure which remains with the catalyst even after the graphite is removed, to give to the subsequently reduced catalyst the desired pore size distribution.

The increased pore size distribution facilitates the introduction into the pores of optimum quantities of cerium, which have a beneficial effect on the efficiency of the catalyst, as hereinabove explained.

When cerium is incorporated in the catalyst by after-treating the reduced catalyst with an aqueous solution of cerium salt, it has also been found important to precede the impregnation step by evacuating all air from the pores, to facilitate the introduction into the pores of the desired amount of cerium.

In this embodiment of the invention, the preferred range of cerium to be added to the reduced catalyst is desirably from 0.1 to 1.5% by weight, preferably from 0.4 to 1% by weight. Particularly effective results are obtained if cerium is added in an amount between 0.3 and 0.8% by weight. Very effective results are also obtained if the amount of cerium incorporated in a catalyst is between 0.45 and 0.7% by weight.

All water soluble salts of cerium will be suitable for incorporation in the reduced catalyst in accordance with this embodiment of the invention. The preferred cerium salt is cerous nitrate as it is most commonly available and adequately soluble. However, other water soluble salts of cerium, such as the acetate or the double salt, cerium ammonium nitrate, may also be used. In this embodiment of the invention, cerium salts may also be used in admixture with salts of other rare earth metals, for example those present in mischmetal. Instead of a salt of cerium alone, a mixture of the salts of cerium and other rare earth metals, such as the mischmetal nitrates, may therefore be used. Examples of other rare earth metals in mischmetal are lanthanum, didymium, yttrium, neodymium, praseodymium or ytterbium.

Tests conducted with the ammonia synthesis catalyst prepared in accordance with the process of this invention have shown a very high activity as evidenced by the considerable increase in the yield of ammonia obtained, when compared with the yield of ammonia obtained using catalysts prepared by methods known in the art under the same operating conditions. As illustrated in Tables 2 to 4, the yield of ammonia is increased up to nearly 40% at comparable temperatures and pressures and space velocities. Moreover, it is possible to operate at much lower temperatures and pressure to obtain excellent ammonia yields. Thus, the operating temperatures for the ammonia synthesis may be as low as 750° to 900°F, suitably 800° to 880°F, and operating pressures used may be below 150 atmospheres. These are much lower than the operating temperatures using catalysts prepared by the process of the art, which are generally from 900° to 1,020°F at a pressure of generally between 150 and 600 atmospheres.

Because of the lower temperature and lower pressure which can be used in the ammonia synthesis, synthesis converters may be used which do not require a double shell construction, with its attendant cost. The reduced capital cost may permit the construction of units of larger capacity at a cost comparable with the cost of smaller units of present construction. The lower temperature and pessure also affords operational savings as it reduces the energy requirements as well as the compressor investment.

The invention will now be illustrated by means of the following examples, without however limiting the invention except as defined in the claims:

EXAMPLE 1 a. Iron oxide, containing traces of conventional promoters such as alumina, calcium oxide, potassium oxide and silica, was mixed together with 0.1% of finely powdered graphite. The raw materials used for the catalyst preparation were the following: (1) New York State natural magnetite ore from Rupublic Steel Corp. (Harmony concentrates), (2) the additives, such as potassium nitrate, aluminum oxide and calcium oxide and powdered graphite, and (3) pure Armco ingot iron in ½ in. diameter rods and 13-gage wire. The average composition of the ore from laboratory determination is shown in Table 1.

Table 1

| Screen Fraction (Tyler Standard) | % of Dry Ore in Fraction |
|---|---|
| +20 mesh | 35.57 |
| −20 +60 mesh | 43.75 |
| −60 mesh | 20.68 |

Natural magnetite ore was first dried in pans and then screened to yield three fractions. The intermediate fraction (−20 +60 mesh) was processed through a magnetic separator to remove silica. The silica content was reduced from 2.39% to about 1%, which is close to the silica concentration in commercial catalysts. The amounts of undesirable impurities as finally determined in the fused catalyst showed 0.035% phosphorus and 0.0007% sulfur.

A small electric resistance fusion furnace was designed and installed for making ammonia synthesis catalyst. The furnace comprised a steel fusion trough, a brick and concrete supporting pier, fume removal hood, and two water-cooled iron electrodes. The fume hood served to remove the fumes of nitrogen oxides evolved during fusion and was connected to a caustic scrubber and to an exhaust fan. Two water-cooled iron electrodes supplied power to the furnace charge from a multi-step transformer. The primary voltage across the transformer at any step was regulated by a variac and this provided fine control up to 240 V.

The fusion trough was lined with high purity natural magnetite which served as refractory and insulation. It was important for controlling the purity of the product by using a refactory lining similar in composition to the material to be fused and containing a minimum of contaminants. The purified ore was arranged in the shell to form a shallow trough. The fusion pig was formed in the center between the two electrodes.

The iron electrodes supplied power to the furnace charge and were connected by a taut handmade chain prepared from an Armco iron wire which is covered with high purity natural magnetite fines and promoters. The function of the wire chain was to conduct the current initially and generate sufficient heat to produce a continuous molten core of iron oxides between the electrodes before melting itself. The molten core was conductive enough to carry the load thereafter. Armco iron rods, in ½ × 1 inch size were added to adjust the ferrous to ferric ratio of the catalyst to 0.5 as nearly as practical. The added iron compensated for atmospheric oxidation during fusion.

A typical fusion charge (exclusive of shell lining) contained about 50 pounds of materials comprising:

| | |
|---|---|
| Purified natural magnetite (−20 +60 mesh) | 50 lbs. |
| Alumina | 1.7 |
| Potassium nitrate | 1.2 |
| Calcium oxide | 3.0 |
| Fine graphite powder (GP-38) from Union Carbide | 0.07 |
| Armco iron (½"×1" rods and 13 gage wire chain) | 0.9–0.95 |

The wire was tied to each electrode by wrapping it around two turns and was then tightened and twisted to hold. The connecting wire chain was manually formed and was located about 3 to 4 inches below the fusion trough surface. The distance between the electrodes was about 18 inches. The charging material after blending for two hours in a blender was distributed evenly along the wire chain to form a mound. The iron rods were placed within the mound.

About 30 V. (the secondary voltage) was applied to the wire chain and was later decreased to about 15 V. gradually over a period of about an hour. As the fusion continued, the resistance between the electrodes decreased, and the primary voltage was dropped by adjusting the variac setting to keep the total KW less than 12.0. This was a limitation of the electrical equipment available. Current varied during the fusion period but was later held constant at about 640 Amp. The power varied during the run from a maximum of about 10 KW in the early part to 6.0 to 6.5 KW toward the end. Total time required to make a fusion was about 5.0 hours.

ON completing a fusion, the circuit was then opened. The pig was allowed to cool overnight before being removed. The unfused and semi-fused material was removed with a wire brush from the surface of the pig. The pig was broken up with a sledge hammer first and then fed to a jaw crusher. The material was then crushed and screened. The −7 +14 mesh (1 to 3 mm size) fraction was recovered as the product. Total material charged to fusion trough was about 48.5 lbs. A pig of 19 lbs. was recovered. After crushing and screening it was classified as follows:

| | | |
|---|---|---|
| +7 mesh | 3.09 lbs. | 16.3% |
| −7 +14 mesh | 6.46 | 34.0% |
| −14 mesh | 9.33 | 49.1% |
| loss | 0.12 | 0.6% |

The oversize material (+7 mesh) was recycled for further size reduction and product recovery. The undersize material was recycled to another fusion. The power consumption for a typical fusion was about 34.5 KW-HR.

The fused catalyst prepared was reduced by hydrogen alone. However, reduction may also be effected with a hydrogen-nitrogen gas. The removal of oxygen by reduction changed the catalyst structure by generating porosity and inner surface areas.

The reduced iron catalyst was pyrophoric in contact with air even at ambient temperature and also very sensitive to poisons. Thus prereduced catalysts were stabilized after reduction. Stabilization consisted of a suface oxidation of the catalyst whereby it takes up an amount of oxygen in the order of 2.0 wt%. The oxygen is removed in the subsequent reduction. This restores the activity of the catalyst.

A 2 inch heavy wall reactor 58 inches long, was installed for catalyst reduction and stabilization. Six thermocouples were installed along the reactor length to indicate the skin temperatures. The procedure for a typical run was as follows:

1. A larger particle size catalyst (6–10 mm) was loaded in between thermocouples-3 to thermocouple-1 to serve as a gas preheater.
2. 1814 gms (−7 +14 mesh) unreduced catalyst was then charged. This bed extended from thermocouple-6 to thermocouple-3 with a screen support at the bottom of this bed.
3. The reactor was pressured to 950–1000 psig using hydrogen gas.
4. Once-through hydrogen flow at a rate of 14.5 SCFH was used.
5. Reactor temperature was raised to 650°F at a rate of 100°F/hr.
6. After reaching 650°F, the rate of heating was decreased to about 25°F/hr. Hydrogen flow increased to 56.0 SCFH (Sp. Vel. = 2100 hr$^{-1}$). Start of catalyst reduction was indicated by the appearance of water in a sample collection bottle.
7. The reactor temperature was brought up to 960°F in about 10 hours.
8. Reactor temperature was mainained at 960°F for about 60 hours. The catalyst was well reduced at this point and the exit gas essentially dry. Hydrogen flow was cut off.
9. The peak temperature in reactor was maintained below 975°F.
10. Pressure was reduced to 75 psig. The reactor was cooled to below 150°F by high nitrogen flow in about 4 hours.
11. A mixture of 1% oxygen and 99% nitrogen was passed through the reactor and left in for about 10 hours. Maximum temperature in the reactor was maintained at below 200°F.
12. As the thermocouple readings approached 200°F, oxygen was cut off in the gas mixture and the reactor purged with nitrogen for about 15 minutes.
13. A mixture of 5% oxygen +95% nitrogen gas was passed into reactor and left in for about 3 hours. Maximum temperature in the reactor was maintained at below 200°F.
14. The catalyst was cooled to less than 120°F by purging with nitrogen.
15. The catalyst was removed from reactor and kept in a sealed bottle.
16. 1434 gm of prereduced catalyst were recovered from the unit.

b. 8.0 gm of cerous nitrate [$Ce(NO_3)_3 \cdot 6H_2O$] was dissolved in 200 gm of deionized water at room temperature. 350 gm of prereduced catalyst to be impregnated was placed in a vessel and evacuated. The cerium solution was then added under vacuum (about 5 to 10 mm). The excess amount of solution (about 145 to 150 cc) was drained off and the catalyst dried in a laboratory oven under vacuum for about 2.0 hours at 300°F. Final analysis indicated a cerium content of generally 0.5 wt% in total catalyst.

EXAMPLE 2 a. The reduced catalyst was prepared as in Example 1(a) above.

b. 2.5 gm of cerous nitrate was dissolved in 100 gm water and soaked into 200 gm of the reduced iron catalyst. The excess amount of the solution was drained off. Final analysis indicated a cerium content of 0.4 wt% of total catalyst.

EXAMPLE 3

The activity of the ammonia catalysts was tested as follows:

250 gm of catalyst (1 to 3 mm size) was charged each time to a test converter. Five thermocouples extended into the catalyst bed to indicate tempratures. The gas used was a $3H_2:1N_2$ mixture. A deoxo unit and a gas purifier were installed in the make-up gas line for oxygen, water and foreign particles removal. The make-up gas flow rate was measured by a flow-meter. It was compressed to the desired pressure by a gas compressor. The make-up then combined with recycled gas, which was measured by a flow-meter. The combined gas was passed through gas preheater and was preheated to a temperature from 400° to 750°F depending on operating conditions. The combined gas was then introduced into the reactor, first through the wrapped copper coils around the catalyst bed and then down through the catalyst bed. The effluent gas from the reactor was passed to a water cooled condenser and a Freon cooled condenser in series. Ammonia made was accumulated in a product receiver. The recycle gas consisted of nitrogen, hydrogen and saturated ammonia vapor and was compressed through a gas recirculation compressor. A part of the recirculated gas was purged before compression to avoid the buildup of any inerts in the system. The purge gas rate was measured by a flow-meter. Ammonia conversion was determined by scrubbing reactor exit gas samples of known volume with excess sulfuric acid and back titrating with standard sodium hydroxide, using methyl red as indicator. The ammonia content thus determined was compared with the equilibrium ammonia content at any given temperature and pressure.

The results obtained using cerium or a mischmetal additive alone and using cerium together with graphite as shown in the accompanying Tables 2 to 4.

As will be noted, the efficiency of the catalyst is increased at all temperature levels. Moreover, temperatures lower than those conventionally used may be employed in the ammonia synthesis, as the efficiency reading at these lower temperatures is sufficiently high.

TABLES 2 – 4

| Receiver Temp. $t_2$, °F | Preheater Temp. $t_3$, °F | CATALYST BED TEMPERATURES, °F | | | | | | Space Vel Hr$^{-1}$ | Recycle NH$_3$% | Make-up Gas H$_2$/N$_2$ | Reactor Outlet NH$_3$% | Equilibrium NH$_3$% | Efficiency % |
|---|---|---|---|---|---|---|---|---|---|---|---|---|---|
| | | $t_4$ | $t_5$ | $t_6$ | $t_7$ | $t_8$ | $t_{avg.}$ | | | | | | |
| Cat. HMR-004 + Mischmetal (1-3 mm) Ce = 0.32% Fe$^{+2}$/Fe$^{+3}$ = 0.65 | | | | | | | | | | | | | |
| 0 | 660 | 830 | 880 | 900 | 955 | 970 | 907 | 17,100 | — | 2.85 | 14.5 | 17.0 | 85.3 |
| 0 | 655 | 830 | 875 | 895 | 945 | 960 | 901 | 16,700 | 1.78 | 2.98 | 15.0 | 17.4 | 86.2 |
| 0 | 640 | 730 | 800 | 845 | 910 | 910 | 839 | 16,400 | 1.91 | 2.91 | 14.5 | 22.65 | 64.0 |
| 0 | 640 | 730 | 800 | 840 | 910 | 900 | 836 | 16,400 | — | 2.91 | 15.9 | 22.95 | 69.3 |
| 0 | 640 | 725 | 795 | 840 | 900 | 900 | 832 | 16,000 | — | 2.91 | 14.7 | 23.35 | 62.9 |
| 0 | 595 | 670 | 740 | 785 | 840 | 800 | 767 | 15,300 | — | 2.91 | 11.8 | 31.2 | 37.8 |
| 0 | 595 | 670 | 740 | 785 | 840 | 800 | 767 | 15,300 | — | 2.91 | 11.75 | 31.2 | 37.7 |
| Cat. HMR-005 + Ce (1–3mm) Ce = 0.65% Fe$^{+2}$/Fe$^{+3}$ + 0.36 Pore Vol. = 0.0546 cc/g Surface Area + 4.44 m$^2$/g | | | | | | | | | | | | | |
| −2 | 680 | 772 | 880 | 920 | 978 | 1002 | 910 | 16,000 | — | 2.56 | 15.3 | 16.75 | 91.3 |

TABLES 2 – 4-continued

| Receiver Temp. $t_2$, °F | Preheater Temp. $t_3$, °F | CATALYST BED TEMPERATURES, °F | | | | | | Space Vel Hr$^{-1}$ | Recycle NH$_3$% | Make-up Gas H$_2$/N$_2$ | Reactor Outlet NH$_3$% | Equilibrium NH$_3$% | Efficiency % |
|---|---|---|---|---|---|---|---|---|---|---|---|---|---|
| | | $t_4$ | $t_5$ | $t_6$ | $t_7$ | $t_8$ | $t_{avg.}$ | | | | | | |
| −2 | 678 | 775 | 880 | 920 | 975 | 1002 | 910 | 16,150 | — | 2.82 | 15.45 | 16.75 | 92.2 |
| −2 | 622 | 700 | 805 | 855 | 922 | 912 | 839 | 16,250 | — | 2.82 | 16.7 | 22.65 | 73.7 |
| −5 | 502 | 658 | 750 | 798 | 865 | 792 | 773 | 16,100 | — | 2.82 | 15.6 | 30.45 | 51.2 |
| −5 | 478 | 618 | 708 | 750 | 783 | 695 | 711 | 16,300 | 1.86 | 2.91 | 11.4 | 38.75 | 29.4 |
| Cat. HMR-009 + Ce (1–3 mm) | | Graphite = 0.14% Ce = 0.5% | | Fe$^{+2}$/Fe$^{+3}$ 0.51 | | Pore Vol. 32 0.0544 cc/g | | Surface Area = 6.46 m$^2$/g | | | | | |
| −8 | 655 | 788 | 882 | 922 | 967 | 990 | 910 | 16,100 | 1.72 | 2.78 | 16.6 | 16.75 | 99.1 |
| −5 | 582 | 705 | 810 | 860 | 915 | 915 | 841 | 16,200 | 1.78 | 2.78 | 17.78 | 22.45 | 79.4 |
| −10 | 548 | 642 | 738 | 798 | 855 | 820 | 770.5 | 16,100 | 1.63 | 2.78 | 16.6 | 30.8 | 53.9 |
| −8 | 460 | 625 | 718 | 778 | 825 | 755 | 740 | 16,400 | 1.99 | 2.78 | 15.3 | 34.7 | 44.1 |
| −8 | 432 | 625 | 705 | 755 | 778 | 698 | 712 | 16,500 | 1.80 | 2.78 | 13.5 | 38.85 | 34.7 |
| −12 | 512 | 715 | 810 | 860 | 910 | 908 | 840.5 | 16,400 | 1.67 | 2.78 | 17.88 | 22.4 | 79.8 |

Having now fully disclosed with particularity preferred modes by which my invention may be carried out various modifications and alterations within the spirit and scope of my invention, as claimed, will occur to those i the art.

What is claimed is:

1. In the process of preparing an ammonia synthesis catalyst based on fused and reduced iron oxide which comprises fusing and reducing of the iron oxide, the improvement comprising effecting the fusion in the presence of a small quantity of graphite, and impregnating the reduced iron oxide with an aqueous solution of a cerium salt.

2. The process claimed in claim 1, in which the cerium salt comprises cerium nitrate.

3. The process claimed in claim 1, in which the iron oxide is fused in the presence of about 0.1 to 0.2% of graphite by weight.

4. The process claimed in claim 1, in which the reduced oxide is impregnated with beween 0.1 and 1.5% of cerium by weight.

5. The process claimed in claim 1, in which the reduced oxide is impregnated with between 0.45 and 0.7% of cerium by weight.

6. The process claimed in claim 1, in which the reduced oxide is impregnated with beween 0.3 and 0.8% of cerium by weight.

7. In the process of preparing an ammonia synthesis catalyst based on fused and reduced iron oxide together with traces of a promoter oxide of an element selected from the group consisting of aluminum, calcium, potassium, magnesium and silicon which comprises fusing and reducing the promoted iron oxide, the improvement comprising effecting the fusion in the presence of a small quantity of graphite and impregnating the reduced promoted iron oxide with an aqueous solution of a cerium salt.

8. The process claimed in claim 7, in which the cerium salt compriss cerium nitrate.

9. The process claimed in claim 7 in which the reduced promoted iron oxide is impregnated with between 0.1 and 1.5% of cerium by weight.

10. The process claimed in claim 7 in which the reduced promoted iron oxide is impregnaed with between 0.45 and 0.7% of cerium by weight.

11. The process claimed in claim 7 in which the reduced promoted iron oxide is impregnated with between 0.3 and 0.8% of cerium by weight.

12. In the process of preparing an ammonia synthesis catalyst based on fused and reduced iron oxide together with traces of a promoter oxide of an element selected from the group consisting of aluminum, calcium, potassium, magnesium and silicon which comprises fusing and reducing the promoted iron oxide, the improvement comprising effecting the fusion in the presence of a small quantity of graphite and impregnating the reduced promoted iron oxide with an aqueous solution of a mischmetal salt.

13. The process claimed in claim 12, in which the mischmetal salt comprises mischmetal nitrates.

14. An ammonia synthesis catalyst produced in accordance with the method of claim 1.

15. An ammonia synthesis catlalyst produced in accordance with the method of claim 7.

16. An ammonia synthesis catalyst produced in accordance with the method of claim 12.

* * * * *